United States Patent [19]

Intermill et al.

[11] Patent Number: 5,751,759
[45] Date of Patent: May 12, 1998

[54] PRE-HEATING FURNACE FOR BAKED AMORPHOUS CARBON BODIES

[75] Inventors: Allan Webster Intermill, Strongsville; Charles Chris Nagy, North Olmsted, both of Ohio

[73] Assignee: UCAR Carbon Technology Corporation, Danbury, Conn.

[21] Appl. No.: 454,739

[22] Filed: May 31, 1995

[51] Int. Cl.$^6$ ..................................... H05B 3/60
[52] U.S. Cl. ............................ 373/123; 373/120
[58] Field of Search .......................... 373/109, 111, 373/117, 120, 122, 123, 125, 126, 128, 131

[56] References Cited

U.S. PATENT DOCUMENTS

| | | |
|---|---|---|
| Re. 27,018 | 1/1971 | Bolkcom et al. ............... 373/120 |
| 1,684,611 | 9/1928 | White ............................ 373/120 |
| 3,114,034 | 12/1963 | Breuer et al. ................. 219/156 |
| 4,015,068 | 3/1977 | Vohler ........................... 373/120 |
| 4,017,673 | 4/1977 | Michels et al. ................ 373/120 |
| 4,916,714 | 4/1990 | Antoni et al. .................. 373/120 |

FOREIGN PATENT DOCUMENTS 0311538   12/1993   European Pat. Off. .

Primary Examiner—Tu B. Hoang
Attorney, Agent, or Firm—Frederick J. McCarthy

[57] ABSTRACT

A furnace for pre-heating carbon bodies prior to pitch impregnation utilizing electrical current flow through the body along its longitudinal axis. The furnace is an apparatus which includes a structural steel framework with roller assemblies to support a carbon body. Electrical contacts and pressing assemblies are provided for establishing pressing forces on the carbon body and the apparatus is configured so that a carbon body can be received on the roller assemblies and contacted by the electrical contact means by adjustment of the pressing assemblies.

3 Claims, 5 Drawing Sheets

1

PRE-HEATING FURNACE FOR BAKED AMORPHOUS CARBON BODIES

BACKGROUND OF THE INVENTION

The present invention is directed to a furnace for pre-heating baked amorphous carbon bodies which are to be densified by impregnation with liquid pitch.

In the manufacture of carbon and graphite electrodes it is a common practice to extrude a mixture of coke particles and pitch to form a shaped amorphous carbon body. This amorphous carbon body is subsequently baked, at a temperature on the order of 800° C. in a baking furnace, e.g. a gas fired furnace, to increase the strength thereof. In the course of baking, some of the pitch is volatilized leaving a large number of small sized pores in the amorphous carbon body. It is important to densify the amorphous carbon body by filling these pores with pitch. This is commonly achieved by a further pre-heating step at a temperature of about 275° C., at which temperature the evacuated porous baked carbon body is immersed in liquid pitch in an autoclave under pressure. Under these conditions, the pitch has a viscosity which enables the filling of the pores in the baked carbon body. Following this impregnation step the amorphous carbon body can be graphitized by well known techniques, e.g. the Lengthwise Graphitization (LWG) procedure which is described in U.S. Pat. No. 4,916,714.

The "pre-heating" of a porous baked carbon body has previously been accomplished in gas fired furnaces since the desired pre-heat temperature, e.g. about 275° C., is relatively low and readily achievable in such furnaces. However, because of the relatively large size of baked carbon bodies destined for use as electrodes in electric arc furnaces, the "pre-heating" required a relatively long time, and the "pre-heating" from the "outside-in" resulted in a non-uniform temperature condition in the baked carbon bodies.

It is therefore an object of the present invention to provide an apparatus for rapidly and uniformly "pre-heating" a baked carbon body to a temperature suitable for pitch impregnation of the body.

Other objects will be apparent from the following description and claims.

SUMMARY OF THE INVENTION

The present invention is a furnace for heating an amorphous longitudinally extending carbon body, having the form of an electrode of cylindrical cross-section, to a temperature which is below the graphitization temperature of the body using an electrical current which passes longitudinally, lengthwise through the carbon body.

The electrical current is about 40,000 A at about 30 volts and is applied only long enough for the carbon body to be heated to about 275° C., much less than the temperature required for graphitization, i.e. 2200–3000° C.

DETAILED DESCRIPTION OF THE INVENTION

Figure 1:
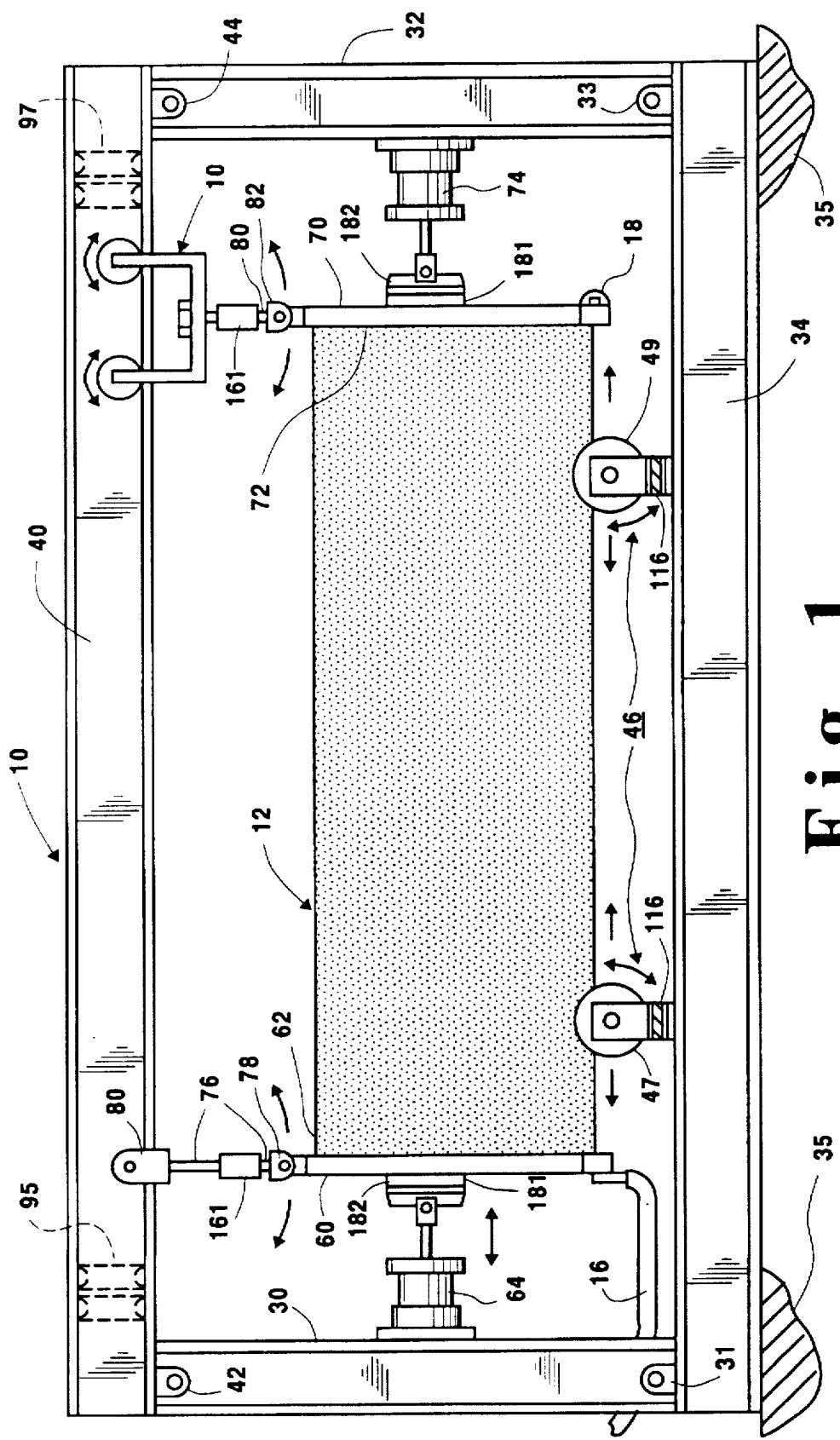
FIG. 1 is a side elevation view of the apparatus of the present invention.
Figure 3:
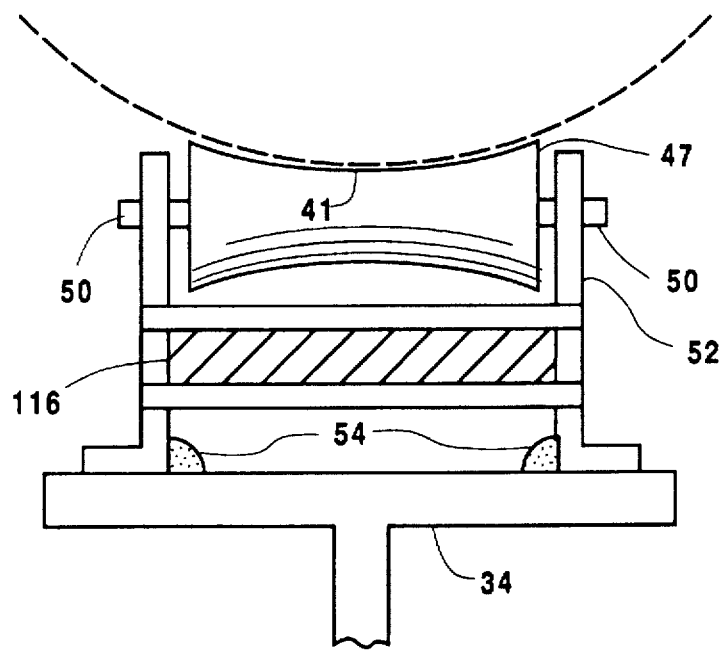
FIG. 3 and 4 are partial front elevation view of portions of the apparatus of FIG. 1.
Figure 4:
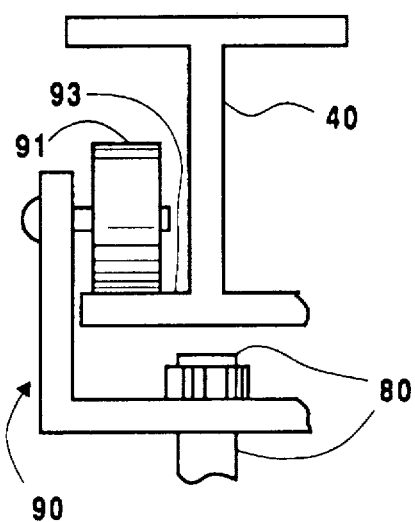
Figure 7:
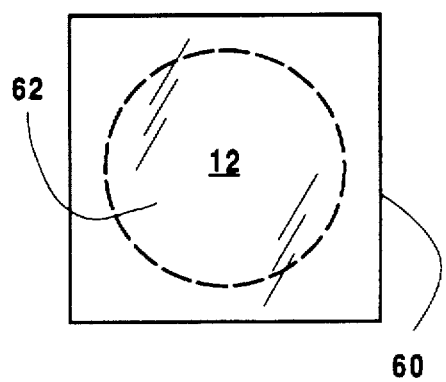
FIG. 7 shows an electrode contact plate of the apparatus of FIG. 1.
Figure 5:
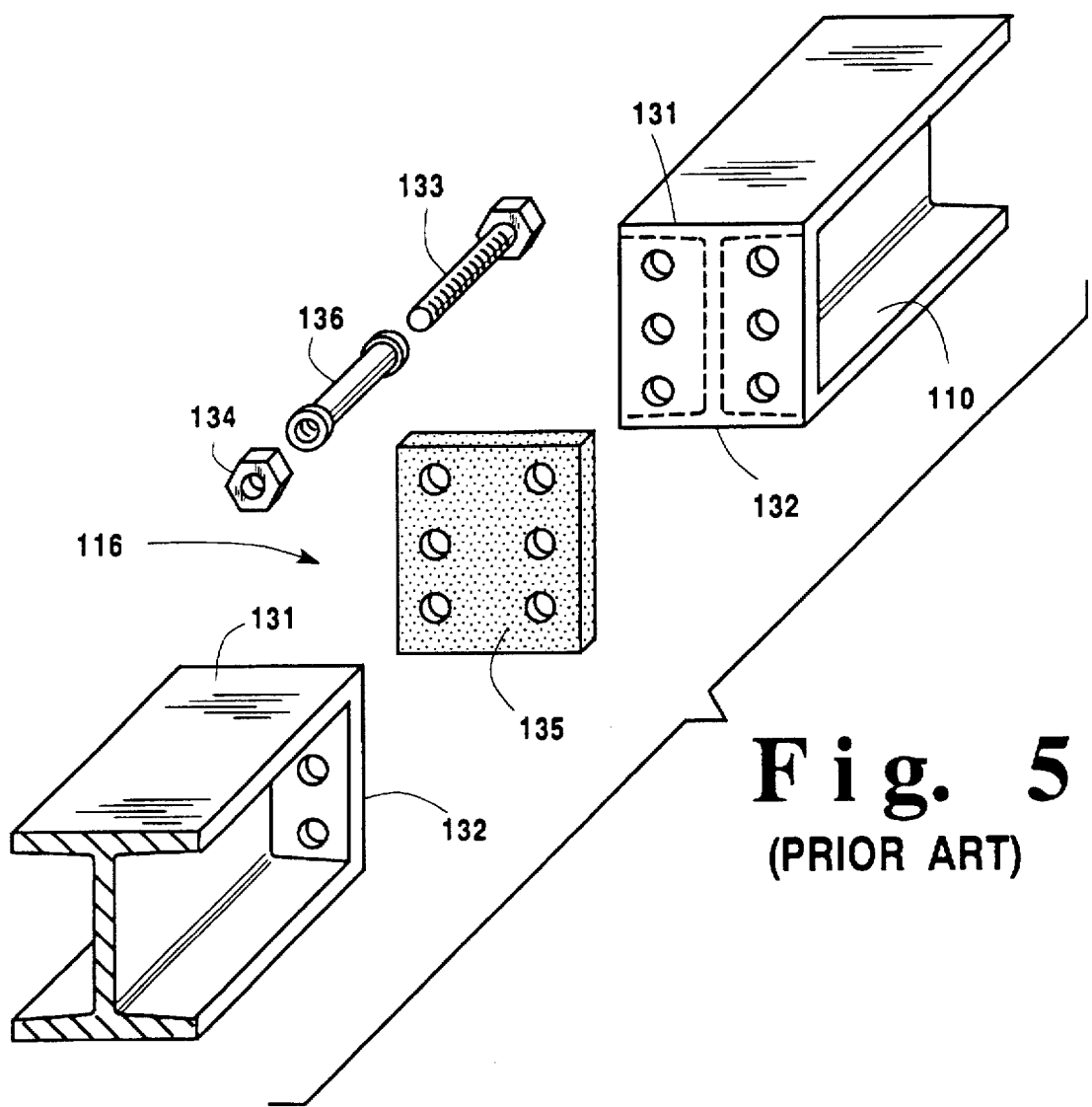
FIGS. 5, 5a, 6 and 6a show prior art electrical isolation devices which are utilized with the apparatus of FIG. 1.
Figure 5A:
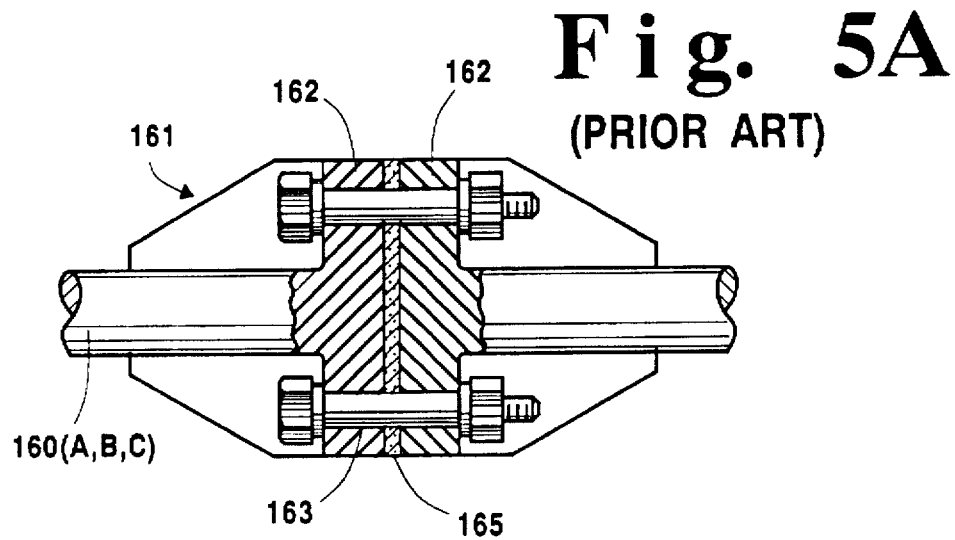
Figure 6:
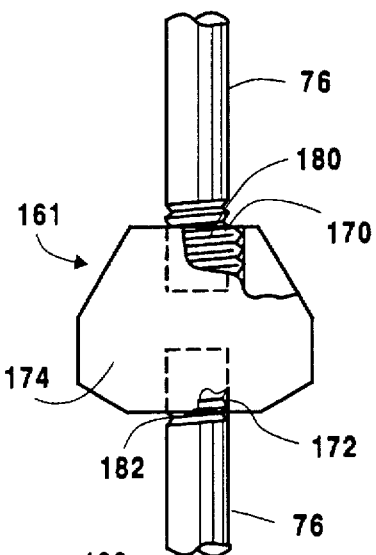
Figure 6A:
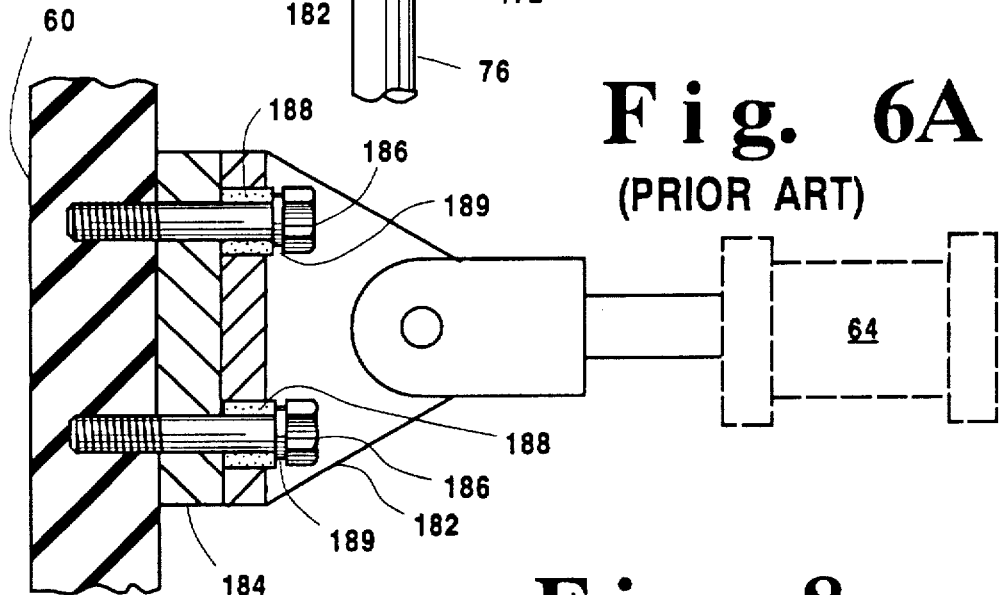

With reference to the drawings, the elevation view of FIG. 1 shows the pre-heating apparatus of the present invention at 10 which is adapted to pre-heat a cylindrically shaped amorphous carbon body 12 by passing electric current from power cable 16, longitudinally through carbon body 12, to cross-over power cable 18. Power cable 18 applies electric current to carbon body 12', positioned alongside carbon body 12, shown more clearly in the plan view of FIG. 2. Electric current passes longitudinally through carbon body 12' to power cable 22. The apparatus of the present invention includes a frame work of structural steel members, e.g. I-beams. A vertical steel member 30 is arranged opposite to and spaced from vertical steel member 32, both of which are fixed, at 31, 33 to a horizontal steel base member 34 which rests on a concrete base 35. Horizontal steel member 40 spans vertical members 30, 32 and is affixed thereto at 42, 44, to provide a rigid structure. Stationary roller assemblies 46, shown in FIG. 3, comprising individual rollers 47, 49, mounted in-line on base member 34, extend between vertical steel members 30, 32. An amorphous carbon body 12 is placed on roller assemblies 46, e.g. by using a fork-lift or other conventional device. Rollers 47, 49 can be grooved, as shown at 41 in FIG. 3, so that carbon body 12 is nested therein and restrained from lateral movement, but can move axially on rollers 47, 49. As shown in FIG. 3, roller 47 (49) is pivotally mounted at 50 in a steel frame 52 which is fixed to steel base member 34 as indicated at welds 54. With amorphous carbon body 12 supported on rollers 47, 49, electrical contact plate 60 is placed in contact with an end 62 of carbon body 12 by actuation of adjustable hydraulic pressing means assembly 64 which is fixedly mounted on vertical steel member 30. Electrical contact plate 70 is concurrently placed in contact with end 72 of carbon body 12 by actuation of adjustable hydraulic pressing means assembly 74, which is fixedly mounted on vertical steel member 32. Contact plates 60, 60' and 70, 70', completely overly and abuttingly contact the entire carbon body surface at ends 62, 72, respectively, as shown in FIG. 7. Electrical contact plate 60 is pivotally supported at 80 by spanning horizontal member 40 through downwardly depending steel rod 76 which is itself pivotally connected to electrical contact plate 60 at clevis 78. Electrical contact plate 70 is pivotally connected to steel rod 80 at clevis 82 and plate 70 is horizontally rollably mounted on spanning member 40 by roller assembly 90 which engages steel rod 80 as shown in FIG. 4 in which roller 91 is shown supported on flange 93 of spanning member 40. Due to the aforedescribed pivotal and rollable support of electrical contact plates 60 and 70, and the roller support of carbon body 12, excellent electrical contact is made with carbon body 12 since differences in length for different carbon bodies are readily compensated by flexible actuation of adjustable pressing means 64, 74 and free longitudinal movement of carbon body 12. Since it is well known that electrical continuity must be interrupted in metal members of the framework, electrical isolation devices, i.e. joints 116 are provided in roller support frames 52. Isolation device 116 shown in FIG. 5 is conventional and is described in U.S. Pat. No. 4,916,714 as comprising a rectangular plate 132 provided with holes and is welded at the ends 131 and the butt joints between both 132 is provided by a bolt and a nut designated by 133 and 134, respectively. To interrupt the electrical continuity, a flat rectangular, bored plate 135 of an electrically insulating material is arranged between plates 132. As the bolts should be insulated as well, they are provided with a sleeve having the form of a cylinder with two washers of electrically insulating material designated by 136 in FIG. 5. The electrical isolation at 161 for support rods 76, 80 is in the form of a commercially available strain rod isolator shown in FIG. 6 comprising a pair of spaced apart threaded metal inserts 170, 172 which are embedded in electrical insulator 174 and receive threaded portions of steel rod 76 as shown at 180, 182. Electrical isolation is also provided at 181 between contact plates 60, 70 and the respective pressing means assemblies 64, 74. This is shown in FIG. 6a, for contact plate 60, where pushing plate 182 is electrically separated from contact plate 60 by electrical insulator 184 and held in place by bolts 186 passing through electrical insulating sleeves 188 and washers 189.

Figure 2:
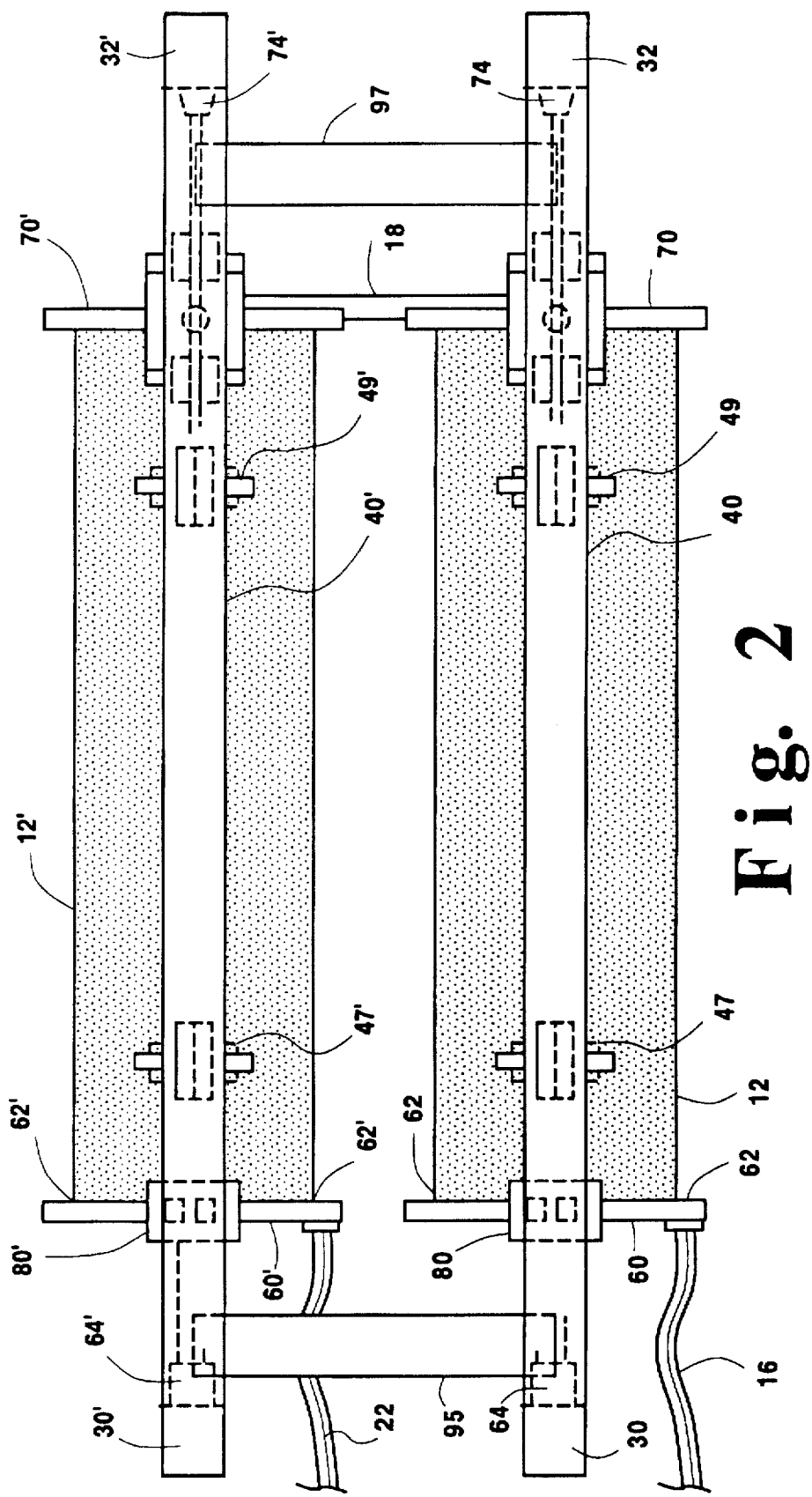
FIG. 2 is a plan view of the apparatus of FIG. 1.
Figure 8:
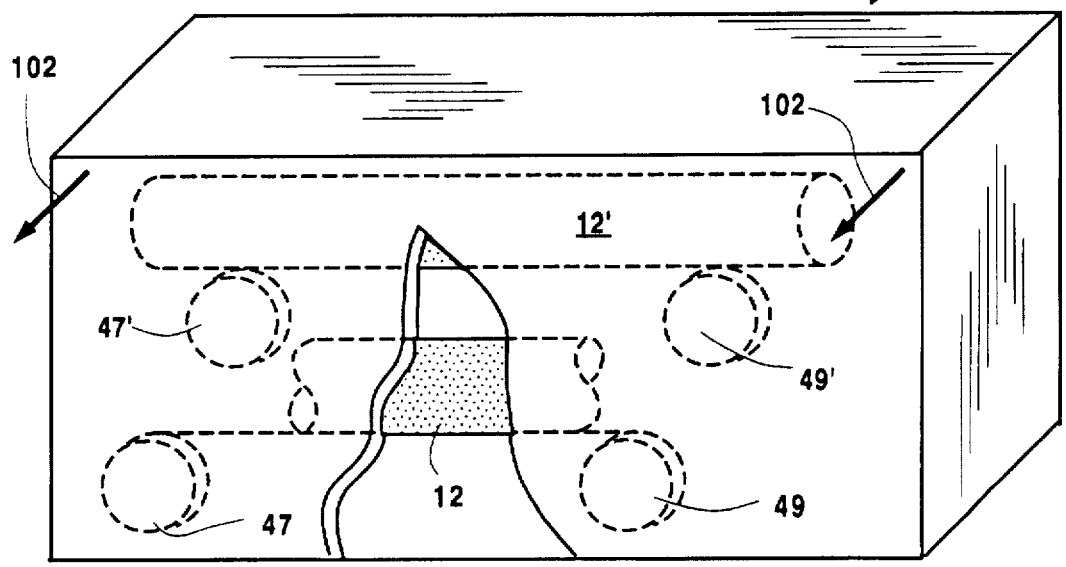
FIG. 8 shows, somewhat schematically, an insulating enclosure for the apparatus of FIG. 1.

The apparatus of the present invention, in a preferred embodiment, shown in FIG. 1 and 2, includes a side-by-side duplicate arrangement, having cross-beam support members 95, 97, for simultaneously pre-heating a second carbon body 12' which receives electrical current by way of cross-over conductor 18. The roller assembly, electrical contact plates and adjustable pressing means for the duplicate arrangement for carbon body 12', operate independently from the arrangement for carbon body 12 so that differences in the lengths of carbon bodies 12, 12' are readily accommodated. The carbon bodies 12, 12' are exposed to ambient air on all sides and the furnace apparatus of the present invention is preferably placed with a thermally insulating enclosure, as illustrated at 100 in FIG. 8, so that the carbon bodies being heated are surrounded by a static environment of ambient air to ensure rapid uniform heating. The enclosure 8 is suitably made from high insulation wall board with a side being removable (as indicated at 102) to enable placement and removal of carbon bodies 12, 12'.

What is claimed is:

1. Apparatus for pre-heating a cylindrically shaped amorphous carbon body comprising:
   a) a framework formed of structural steel members including
      i) a first vertical steel member arranged opposite to and spaced from a second vertical steel member
      ii) a horizontal steel member spanning the first and second vertical steel members and affixed thereto to provide a rigid structure;
   b) a first stationary roller assembly extending horizontally in-line between the first and second vertical steel members adapted to support an amorphous cylindrically shaped carbon body extending between said first and second steel members and to permit said amorphous carbon body to roll back-and-forth on said roller assembly between said first and second vertical steel members;
   c) a first electrical contact means pivotally supported by and depending downward from said horizontal member adjacent said first vertical support member;
   d) a second electrical contact means rollably supported by and depending downward from said horizontal member adjacent said second vertical support;
   e) a first adjustable pressing assembly fixedly mounted on said first vertical support member for applying a pressing force on said first electrical contact means;
   f) a second adjustable pressing assembly fixedly mounted on said second vertical support member for applying a pressing force on said second electrical contact means;
   said apparatus being configured so that a shaped carbon body can be received on said roller assembly between said first and second electrical contact means and be contacted by said first and second contact means through adjustment of the first and second pressing assemblies.

2. Apparatus in accordance with claim 1, wherein
   a) said framework formed of structural steel members includes
      i) a third vertical steel member arranged opposite to and spaced from a fourth vertical steel member
      ii) a horizontal steel member spanning the third and fourth vertical steel members and affixed thereto to provide a rigid structure;
   b) a second stationary roller assembly extending horizontally in-line between the third and fourth vertical steel members adapted to support an amorphous shaped carbon body extending between said third and fourth steel members and to permit said amorphous carbon body to roll back-and-forth on said roller assembly between said third and fourth vertical steel members;
   c) a third electrical contact means pivotally supported by and depending downward from said horizontal member adjacent said third vertical support member;
   d) a fourth electrical contact means rollably supported by and depending downward from said horizontal member adjacent said fourth vertical support;
   e) a third adjustable pressing assembly fixedly mounted on said third vertical support member for applying a pressing force on said third electrical contact means;
   f) a fourth adjustable pressing assembly fixedly mounted on said fourth vertical support member for applying a pressing force on said fourth electrical contact means;
   g) means for electrically connecting said second and third electrical contact means;
   said apparatus being configured so that said first and second roller assemblies are in a side-by-side relation and so that a shaped carbon body can be received on said roller assembly between said third and fourth electrical contact means and be contacted by said third and fourth contact means through adjustment of the first and second pressing assemblies.

3. Apparatus in accordance with claim 1 in combination with a thermally insulating enclosure which substantially surrounds said apparatus.

* * * * *